(12) United States Patent
Bookwalter et al.

(10) Patent No.: US 6,272,273 B1
(45) Date of Patent: Aug. 7, 2001

(54) HERMETIC CABLE JOINT

(75) Inventors: Ted Bookwalter, Vancouver, WA (US); Richard Jones, Beaverton, OR (US); Joe Wojno, Vancouver, WA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/388,528

(22) Filed: Sep. 2, 1999

(51) Int. Cl.$^7$ ........................................................ G02B 6/44
(52) U.S. Cl. ........................... 385/100; 385/97; 385/72; 385/87; 385/98; 385/99
(58) Field of Search .................... 385/95–100, 70–72, 385/87

(56) References Cited

U.S. PATENT DOCUMENTS

| | | |
|---|---|---|
| 4,784,459 | 11/1988 | Jenkins . |
| 4,804,252 * | 2/1989 | Betzler et al. ............... 350/96.23 |
| 5,005,940 | 4/1991 | Modrey . |
| 5,048,921 | 9/1991 | Jones et al. . |
| 5,159,655 | 10/1992 | Ziebol et al. . |
| 5,317,664 | 5/1994 | Grabiec et al. . |
| 5,321,784 | 6/1994 | Cubukciyan et al. . |
| 5,455,880 * | 10/1995 | Reid et al. ........................ 385/87 |
| 5,455,881 * | 10/1995 | Bosisio et al. .................. 385/100 |
| 5,475,782 * | 12/1995 | Ziebol ............................. 385/87 |

* cited by examiner

Primary Examiner—Hemang Sanghavi
Assistant Examiner—Jennifer Doan
(74) Attorney, Agent, or Firm—Sughrue, Mion, Zinn, Macpeak & Seas, PLLC (57) ABSTRACT

The present invention provides an apparatus and method for jointing two opposed ends of fiber optic cables to result in a hermetic cable joint. Two fiber optic cables are cut to expose each wire strand of each cable, and a tube joint is formed by joining the optical fibers of the two cables such that the tube joint is located under the wire strand of the first cable. A tapered crimp sleeve is applied over the exposed inner layer and outer layer of each of the wire strands of the two cables, the inner layer and outer layer forming stepped portions within the crimp sleeve. The crimp sleeve tapers outwardly from a central portion, such that its two ends are of a larger diameter than the central portion of the crimp sleeve. When the inner layer and outer layer of each wire strand is crimped, the crimp sleeve attains approximately the same diameter along its length. A circumferential ring is integrally formed with and protrudes from an inner surface of the crimp sleeve at one end, to provide a further hermetic seal when the crimp sleeve with the ring is crimped to one of the cables. A spring is applied to the wire strand of one of the cables, and soldered to the crimp sleeve and to the cable. The tube joint is located under this spring.

33 Claims, 4 Drawing Sheets

HERMETIC CABLE JOINT

The present invention relates to an apparatus and method for jointing cables. In particular, the present invention includes a fiber optic cable joint with a varying inside crimp diameter, wherein the sharing of force transfer between layers of the wire strands of the fiber optic cables and the crimp can be maximized, to permit the minimum possible overall outside diameter and length.

BACKGROUND OF THE INVENTION

In conventional cable crimp joints, the crimp sleeve has always been sized such that a small diameter and length was very difficult to obtain. For example, when conventional optical fiber cable ends are cut flush and butted together, a crimp of a single inside diameter and sufficient cross-sectional area would be required to carry the entire load, resulting in a larger outside diameter and longer length.

The cable joints disclosed by Jones et al, U.S. Pat. No. 5,048,921, and Jenkins, U.S. Pat. No. 4,784,459, are typical of the prior art in which the joints are large in diameter and are neither flexible nor simply configured.

In particular, Jones et al disclose fibers spliced together at 28 at the center of the cable joint and encapsulated with a thin plastics coating. A tubular member 10 is fitted over the spliced fiber and exposed metal tube 2. Metal ferrules 27 are slid over the member 10, and a tapered hollow insert 26 is slid into position over the wires 6A. Sleeve-like intermediate inserts 25 are positioned over the wires 6A, and collars 24 are clamped towards each other. An outer casing 32 acts as a bridging member connecting the collars 24. Thus, with the quantity of components needed, the cable joint is large in diameter and complicated to attain.

Jenkins is similar in that the reference discloses a submarine cable joint which includes two cables 2, 3, each including an annular tensile layer 28 surrounding at least one optical fiber 4, 5 wherein the annular tensile layers 28 are connected to opposed positions on a coupling member 8, and leading a length of each fiber to be joined to a position outside the coupling member 8. After the tensile layers 28 are fixed to the coupling member 8, the fiber lengths are joined together and a housing fitted around the joined fibers and the coupling member 8. Thus, the cable joint in Jenkins suffers from the same disadvantages as the one in Jones et al, wherein the cable joint is neither compact, flexible, or simply configured.

Ziebol et al, U.S. Pat. No. 5,159,655 discloses an optical fiber crimp with a first crimping portion 52 and a second crimping portion 54 biased toward one another, to securely crimp a fiber within a cut-away ferrule 14. This connector subassembly is not designed to maximize tensile strength.

Thus, the above cable joints are not optimized with respect to compactness, tensile strength, and cable handling. In addition, the cable joints are complicated and require excess components.

SUMMARY OF THE INVENTION

It is an object of the present invention to provide a cable joint for the inline connection of fiber optic cables which is simple to assemble, includes low cost components, maximizes the coupling of tensile forces, and which includes a short assembly time. A second object of the invention is to provide a small diameter joint, in order to improve cable handling. A third object of the present invention is to provide a hermetically sealed cable joint, in order to maximize resistance to hydrogen ingress.

In attaining these and other objects, the present invention provides a cable joint for the inline connection of fiber optic cables, in which two opposed ends of light-weight fiber optic cables are joined. The two fiber optic cables are cut to expose each wire strand of each cable, and a tube joint is formed by joining the optical fibers of the two cables such that the tube joint is located under the wire strand of the first cable. The tube joint includes a capillary tube which extends under the cable joint to provide additional hoop strength for crush resistance.

A tapered crimp sleeve is applied over the exposed inner layer and outer layer of each of the wire strands of the two cables, the inner layer and outer layer forming stepped portions within the crimp sleeve. The staggered different inside diameters provide complete coupling to the inner wire nest allowing a maximum cross-sectional area of the crimp sleeve for strength.

The crimp sleeve tapers outwardly from a central portion, such that its two ends are of a larger diameter than the central portion of the crimp sleeve. When the inner layer and outer layer of each wire strand is crimped, the crimp sleeve attains approximately the same diameter along its length.

A raised circumferential ring is integrally formed within one end of the crimp sleeve to provide a further hermetic seal when crimped to one of the cables. The crimp sleeve is crimped over the ring, providing a hermetic seal between the conductive tube of one of the cables and the crimp sleeve.

The present invention further incorporates a soldered spring which surrounds an exposed outer wire strand in one of the cables, providing a hermetic seal. The spring is soldered to the crimp sleeve and to the cable. The tube joint is located under the spring. The hermetic seal prevents hydrogen ingress. The soldered spring provides the additional benefits of strength and flexibility for cable handling.

With the above configuration, the sharing of force transfer between the two wire layers in each of the cables and the crimp sleeve is maximized. This configuration also permits a reduced outer diameter and length for the cable joint because the crimp carries the total load only at the maximum cross sectional area. In addition this invention combines carbide grit with crimping and an epoxy adhesive to increase the coupling forces in the joint.

BRIEF DESCRIPTION OF THE DRAWINGS

The above objectives and advantages of the present invention will become more apparent by describing in detail several preferred embodiments thereof, with reference to the attached drawings in which.

DETAILED DESCRIPTION OF THE PREFERRED EMBODIMENTS

Figure 1:
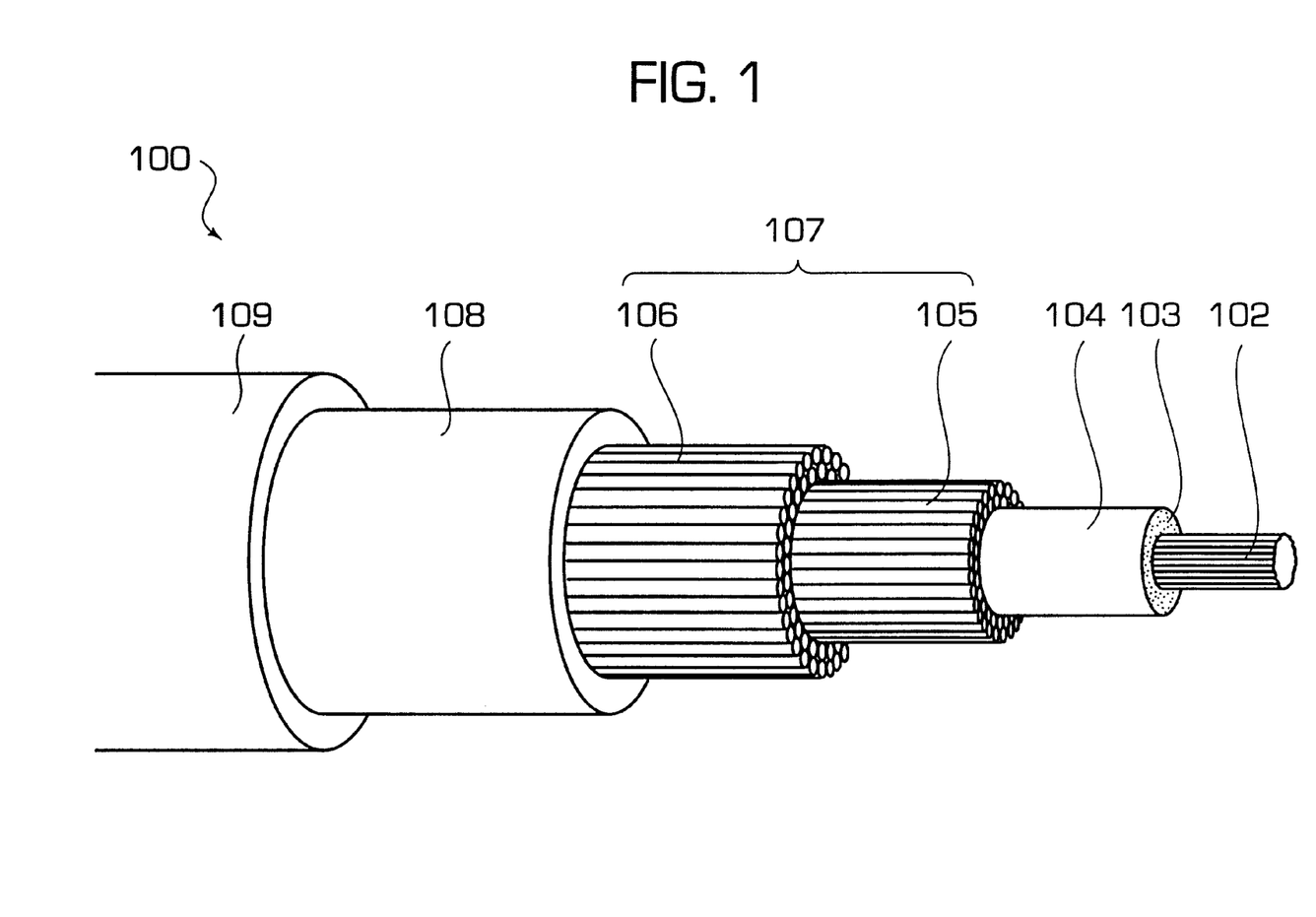
FIG. 1 shows a perspective view of one end of a cable which is joined in the cable joint according to the present invention.

The present invention provides a hermetic, small diameter cable joint for joining two opposed ends of light-weight fiber optic cables, as shown in FIG. 1 of the drawings according to a preferred embodiment of the present invention. The fiber optic cable 100 shown in FIG. 1 includes optical fibers 102 which provide a path for light transmission and which extend axially through a central tube 104. The central tube 104 may be formed of steel (e.g., 4340 steel) or another suitable material (i.e., titanium, beryllium/copper etc.) which provides protection for processing and has sufficient strength to carry a load, and is able to be crimped without fracturing and with a reasonable force. The space between the central tube 104 and the optical fibers 102 may also contain a water blocking agent 103, such as a gel, which allows the fibers to be suspended in a low stress condition.

The fiber optic cable 100 further includes a two layer wire strand 107 which provides tensile strength for deployment and recovery and a nested pressure vault to withstand the hydrostatic pressures of deep water (approximately 500 Bar at a depth of 5 km, with the cable deployment and recovery intended for up to twice this depth in some cases). The wire strand 107 includes an inner wire layer 105 and an outer wire layer 106. The wire layers 105, 106 may be formed of steel (i.e., 4340 steel) or other suitable materials (i.e., titanium, beryllium/copper, etc.) which provide sufficient tensile strength and an adequate nested pressure vault.

A conductive tube 108 annularly surrounds the wire strand 107. The conductive tube 108 serves to conduct electrical current needed to power amplifiers (not shown) in a fiber optic system (not shown) containing the cable 100. The conductive tube 108 may be formed of copper, in which case the tube 108 further provides a barrier to hydrogen ingress. This is desirable because hydrogen harms certain optical fibers, by permeating the glass optical fibers, increasing scattering and absorption, and thereby causing light loss.

The fiber optic cable 100 further includes an insulating layer 109 disposed surrounding the conductive tube 108. The insulating layer 109 provides high voltage insulation for the conductive layer 108, which conducts electrical current. The insulating layer 109 may be formed of polyethylene or another suitable insulating material.

Figure 2:
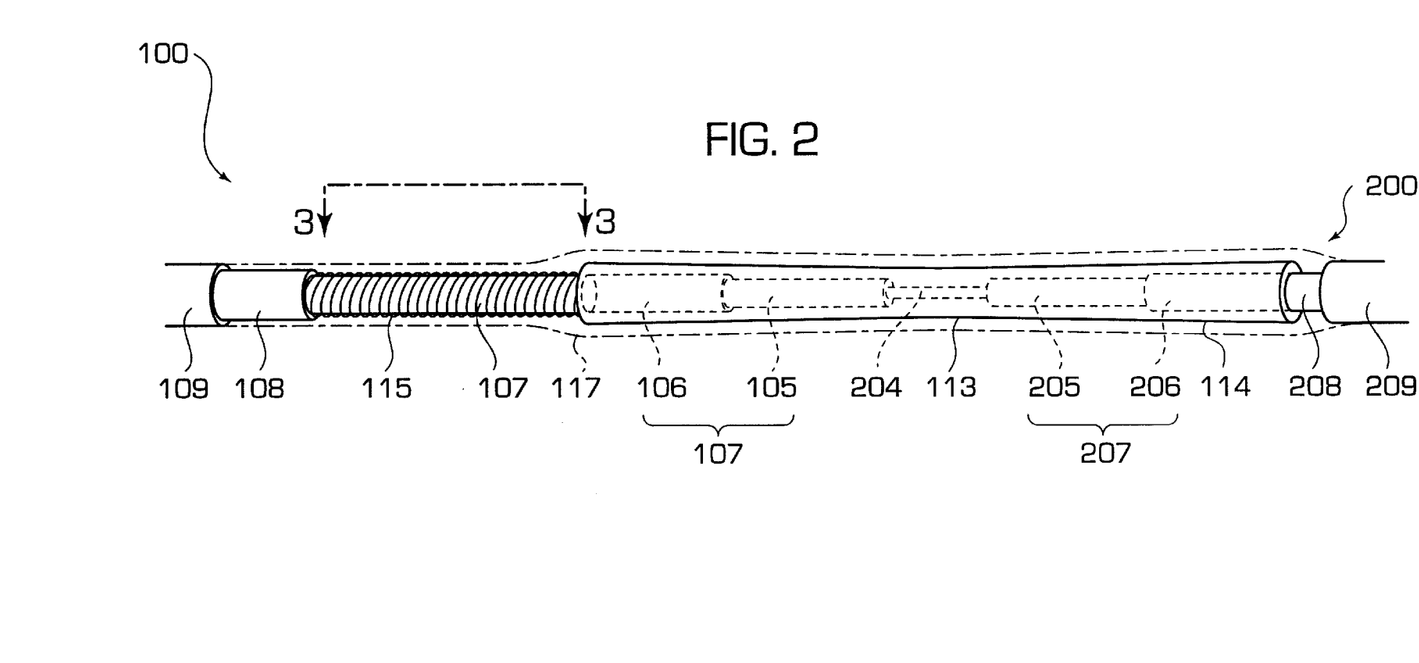
FIG. 2 shows a cross-section of a cable joint according to a preferred embodiment of the present invention.

FIG. 2 shows a cross-section of a cable joint 110 for joining two opposed ends of fiber optic cables 100, 200, according to a preferred embodiment of the present invention. The cable joint 110 includes a tube joint 111 (see FIG. 3) which is positioned in the cable joint 110 of cable 100 under outer wire strand 107 (see 3—3 in FIG. 2).

Figure 3:
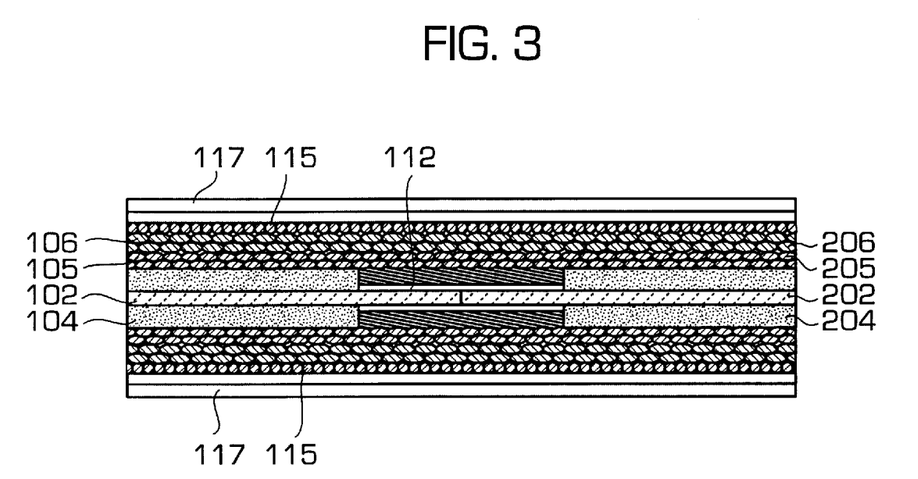
FIG. 3 shows a transverse cross-section of an exemplary tube joint which is positioned under a portion of the wire strands in one cable of the cable joint according to the present invention.
Figure 4:
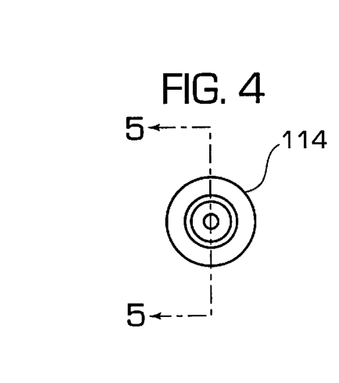
FIG. 4 shows an end view of a tapered crimp sleeve for use in a cable joint of the present invention.

FIG. 3 shows a transverse cross-sectional view of an exemplary tube joint 111 including a capillary tube 112. The capillary tube 112 may be formed of steel (i.e., 4340 steel) and is insertedly connected to the exposed end of the central protective tube 104 of the first cable 100 and extends through the central protective tube 204 (see FIG. 3) of the second cable 200 into the central portion 113 of the crimp sleeve 114, in order to provide maximal hoop strength for crush resistance.

As shown in FIG. 3, the optical fibers 102, 202 of the respective cables 100, 200 are joined at a central portion of the tube joint 111 and extend axially inside the capillary tube 112. The optical fibers 102, 202 may be joined by fusion splicing or other suitable tube jointing techniques.

In the tube joint 111, the exposed ends of the two central tubes 104, 204 are crimped to the capillary tube 112, coupling the capillary tube 112 to the central tubes 104, 204. The central tubes 104, 204 may be coupled to the ends of the capillary tube 112 by several crimps on the two central tube ends 104, 204, over the two ends of the capillary tube insert 112.

The wire strand 107 (see FIG. 2) is coated with a heat cured two part epoxy adhesive with carbide grit (not shown), at the inner layer 105 and the outer layer 106 to provide added strength and coupling of forces.

The cable 100 has a brass or copper spring 115 which is applied over the wire strand 107 (see FIG. 2) and which extends from the exposed end of the copper conductive tube 108 to the exposed end of the crimp sleeve 114 at cable 100. The tube joint 111 is disposed under wire strand 107 at the spring 115. The spring 115 may be formed of brass, copper, or steel or other materials having suitable strength and flexibility. Alternatively, the spring 115 can be replaced by a wire mesh (not shown).

The spring 115 is soldered to the copper conductive tube 108 at the spring interface, along the entire length of the spring 115, and at the spring 115 and crimp sleeve 114 interface. The solder provides additional strength for holding the wire strand 107 together, while providing sufficient flexibility for cable handling.

A tapered crimp sleeve 114 is disposed annularly over the wire strands 107, 207, with the capillary tube 112 extending between the two wire strands 107, 207. The exposed wire strands 107, 207 form stepped portions, with the outer layers or steps 106, 206 having a larger diameter than the inner layers or steps 105, 205, with the capillary tube 112 disposed between the inner layers 105, 205. The wire strands 107, 207 are connected to the crimp sleeve 114 at each end of the crimp sleeve 114 using the two part epoxy adhesive with carbide grit (not shown). At one end of the crimp sleeve, at the cable 100, the crimp sleeve 114 is soldered to the copper spring 115 and is crimped at the center of each layer 105, 106 of the wire strand 107, to form the stepped portions.

Figure 6:
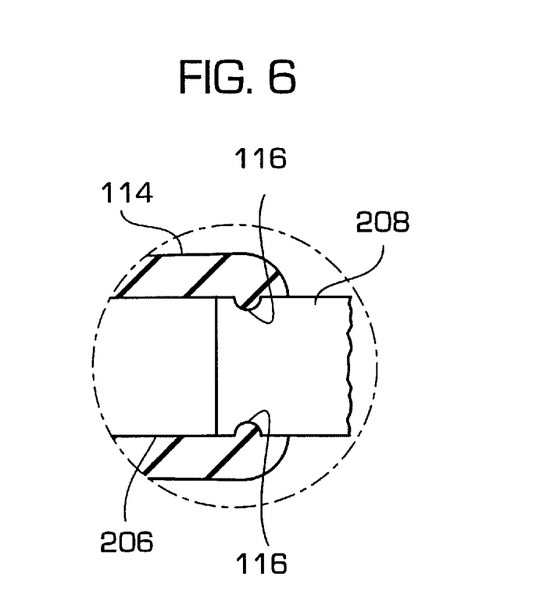
FIG. 6 shows a transverse fragmentary cross-section of the cable joint showing the circumferental ring.

Internal to the crimp sleeve 114, and disposed at the other end of the crimp sleeve 114, at the cable 200, is a raised circumferential ring 116 which is integral to the crimp sleeve 114 and which extends from the inner surface of the crimp sleeve 114 to be positioned over the exposed conductive tube 208 of the second cable 200, as shown in FIG. 6. The raised circumferential ring 116 provides a hermetic seal when crimped to the copper conductive tube 208. The crimp sleeve 114 is crimped at the center of each layer 205, 206 of the wire strand 207 to form the stepped portions, as well as at the end of the sleeve 114 over the raised circumferential ring 116, to provide a hermetic ring seal between the conductive tube 208 and the crimp sleeve 114.

Figure 5:
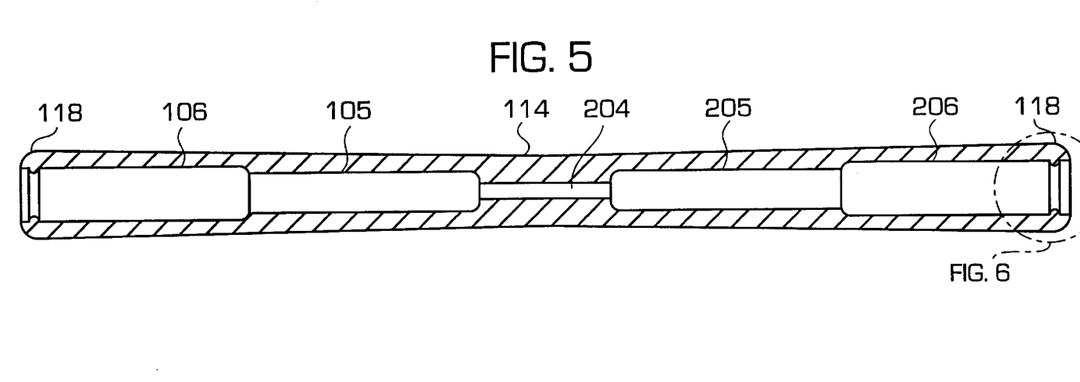
FIG. 5 shows a cross-section of a tapered crimp sleeve for use in a cable joint according to the preferred embodiment of the present invention.
Figure 7:
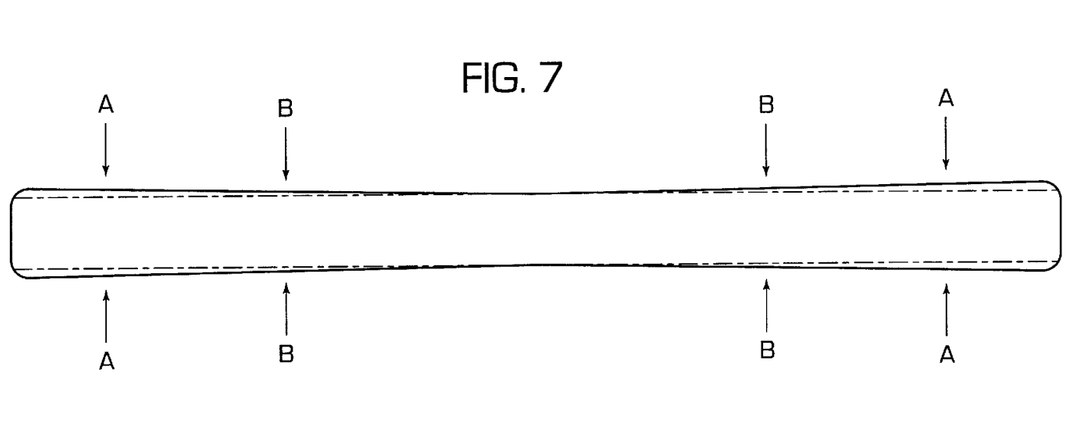
FIG. 7 shows a schematic view of the crimp sleeve which shows the outer diameter before and after crimping.

As shown in FIG. 5, the crimp sleeve 114 is gradually tapered from the center to the ends 118 such that the outer circumference of the ends 118 of the crimp sleeve 114 is larger than that of the central portion 113 of the crimp sleeve 114. When the crimps are performed, with a varying force of A at the outer layers 106, 206, and B at the inner layers 105, 205, the crimp sleeve 114 ends up being essentially the same in diameter along its entire longitudinal length, as shown in FIG. 7.

The crimp sleeve 114 (and its integral raised circumferential ring 116) may be formed of steel, titanium, beryllium/copper, or other materials having sufficient strength to carry the load. The crimp sleeve material must also be able to withstand crimping without fracturing, where the crimping is performed with reasonable force.

The cable joint 110 further includes an insulation mold 117 which annularly surrounds the crimp sleeve 114, the wire strand 207, the copper spring 115 and conductive tube 108, and which is amalgamated with the insulation layers 109, 209 of the respective two cables 100, 200 (see FIG. 2). The insulation mold 117 may be formed of polyethelene or other suitable insulating materials and should be sufficiently thick to withstand the voltage requirements of the cable design.

Further, the ends 118 of the crimp sleeve 114 are radiused to minimize voltage stress on the polyethylene insulation mold 117.

A method for making the cable joint 110 which joins the two opposed ends of fiber optic cables 100, 200, according to the above preferred embodiment of the present invention, will now be described, with reference to FIGS. 2 and 3.

Using a first cable 100, approximately 500 mm of insulation 109 is stripped off of the conductive tube 108 from one cable 100 end, exposing the conductive copper tube 108. The exposed conductive tube 108 is then cut back approximately 70 mm from the cable 100 end, exposing the outer layer 106 of the wire strand 107. Next, the exposed outer layer 106 of wires is cut approximately 35 mm from the cable 100 end, in preparation for later insertion into the crimp sleeve 114.

The exposed conductive copper tube 108 is then further cut back to within approximately 50 mm of the insulation layer 109, further exposing the layers 105, 106 of wire strand 107. Next, the wire strand 107 is pulled away from the central tube 104 so that the central tube 104 and optical fibers 102 can then be cut back approximately 300 mm. This will later position the capillary tube 112 in the one end of the cable 100 of the cable joint 110. In fact, the tube joint 111 is not disposed under the central portion 113 of the cable joint 110, but to one side, in the cable 100 under wire strand 107. The reason is that the capillary tube 112 inserted during the tube jointing process will extend under the cable joint 110 to provide increased crush resistance during the cable joint, sleeve crimping process.

The central tube 104 is then cut back approximately 150 mm in order to expose the ends of the optical fibers 102 for connection to the optical fibers 202 of the second cable 200 in the tube jointing process (see below).

Next, the wire strand 107 is pulled away from the central tube 104, in order to allow room for sliding the crimp sleeve 114 over the central tube 104. The crimp sleeve 114 is then slipped over the central tube 104 and temporarily placed under the wire strand 107, exposing the central tube 104 out the other end of the crimp sleeve 114. The crimp sleeve 114 may be formed of steel, titanium, beryllium/copper, or other suitable materials.

The second cable 200 has its opposing end prepared in a different fashion. Approximately 500 mm of insulation 209 is stripped off of the conductive copper tube 208 from the cable 200 end, exposing the conductive tube 208. The exposed conductive tube 208 is then cut back to within approximately 50 mm from the polyethylene insulation layer 209, exposing the outer layer 206 of the wire strand 207.

Next, the wire strand 207 is cut such that the outer layer 206 extends approximately 35 mm from the end of the exposed conductive tube 208, and the inner layer 205 extends approximately 35 mm from the end of outer layer 206.

Thus, the central tube 204 is exposed by approximately 380 mm by cutting back the two layers 205, 206 of the wire strand 207. The central tube 204 is then cut back approximately 200 mm, in order to expose the ends of the optical fibers 202 for connection to the optical fibers 102 of the first cable 100 in the tube jointing process.

Next, the tube jointing process is performed. The tube joint itself takes place in the area of 500 mm of exposed and folded back wire strands 107 in the cable 100. The capillary tube 112 must extend on the other end underneath the cable joint 110 crimp sleeve area in the end of the cable 200, in order to provide the maximum possible hoop strength for crush resistance. This crush resistance will make the later crimping process for the cable joint crimp sleeve 114 more robust.

In the tube jointing process, a capillary tube 112, made of steel or other suitable material, is inserted into the exposed central tube 104 of the first cable 100, and over the optical fibers 102, such that the optical fibers 102 extend axially out of the capillary tube 112, as shown in FIG. 3. The optical fibers 102, 202, which extend from exposed ends of the two cables 100, 200, are then joined by fusion splicing or another suitable technique. The capillary tube 112 is then slid over the joined optical fibers 102, 202 such that, although the tube joint 111 is disposed under cable 100 at wire strand 107 (under spring 115 in FIG. 3), the capillary tube 112 itself extends axially into the central tube 204 of the second cable 200. The two central tubes 104, 204 are then coupled to the capillary tube 112 by crimping the ends of the central tubes 104, 204 over the ends of the capillary tube 112.

In order to further strengthen the joint, a heat cured two part epoxy may be applied with a carbide grit (not shown) to both the exposed layers 205, 206 of the wire strand 207, and the wire strand 207 is inserted into the crimp sleeve 114.

The next step is to slide the crimp sleeve 114 over the end of the conductive tube 208 of the second cable 200 from its temporary position under the wire strand 107. There should be approximately 5 mm of clearance between the crimp sleeve 114 and the conductive tube 208.

Integral to the crimp sleeve 114 is a raised circumferential ring 116, which protrudes from the inner surface of the crimp sleeve 114. The exposed conductive tube 208 of the second cable 200 is inserted into the crimp sleeve 114 at the second cable 200 end, and the circumferential ring 116 is positioned over the exposed conductive tube 208, to provide a hermetic seal when the ring 116 is later crimped onto the copper conductive tube 208.

The inner layer 105 of the first cable 100 is then coated with a two part heat cured epoxy and carbide grit, to further strengthen the cable joint 110. Next, the inner layer 105 of the wire strand 107 is inserted into the crimp sleeve 114, by using a split die with the strand profile machined on the inside diameter of the die to restore the required lay length of the wire strand 107. The split die (not shown) is placed over the exposed inner layer 105, near the end of the exposed conductive tube 108. The die is then rotated by hand down the exposed inner layer 105 of the wire strand 107, restoring the inner layer 105 to its full length such that the ends of the wires of the inner layer 105 are fully inserted into the crimp sleeve 114.

The outer layer 106 of the wire strand 107 of the cable 100 is then inserted into the crimp sleeve 114 by following the same steps to restore the lay length of the outer layer 106, as was performed with the inner layer 105. In order to hold the wire strand 107 temporarily in place during the crimping process, the wire strand 107 is bound around its circumference using a wire, plastic binder, or other suitable binding.

The crimp sleeve 114 is then crimped using a hydraulic press (not shown) and a segmented die (not shown). Two crimps are required at cable 100, one at the center of each layer 105, 106 of the wire strand 107 to form the stepped portions, and three crimps are required at cable 200, also at the center of each layer 205, 206 of the wire strand 207 to form the stepped portions, as well as an additional crimp at the end of the sleeve 114 over the portion having the raised circumferential ring 116 where the copper conductive tube 208 is disposed, so that a hermetic ring seal between the conductive tube 208 and the crimp sleeve 114 is formed. The temporary wire or plastic binders (not shown) are removed after the crimping process.

Next, a brass or copper spring 115 is applied around the exposed wire strand 107, between the copper conductive tube 108 at one end, and the crimp sleeve 114 at the other end. The spring 115 is either coiled around the wire strand 107 using a length of brass or copper, or is already coiled and moved into position from a temporary placement over the copper tube 108 of the cable 100. The spring 115 helps to hold the wire strands 107 together, while being sufficiently flexible for cable handling. The spring 115 may also be formed of steel, or other materials having suitable strength and flexibility. Alternatively, the spring 115 can be replaced by a wire mesh (not shown) formed of brass, copper, steel or other suitable materials.

Next, electrical contact is made to the two exposed conductive tubes 108, 208 in order to heat the wire strands 107 and the cable joint 110 at both ends of the crimp sleeve 114. The wire strands 107 and cable joint 110 are heated by resistive heat and the temperature controlled to approximately 250–300° C., while a tin/lead solder is applied to the spring 115 area of the cable 100 over the wire strand 107, from the interface between the conductive copper tube 108 and the spring 115 to the interface between the spring 115 and the crimp sleeve 114, along the entire length of the spring 115.

The solder provides a hermetic barrier to the cable joint 110 at the cable 100, and the spring 115 provides the strength to hold the wire strand 107 together while being sufficiently flexible for easy cable handling. The heating further serves to cure the two part epoxy adhesive with carbide grit between the layers 105, 106.

The solder used is a tin/lead solder or other suitable soldering material. In addition, the solder is selected to have a melt temperature which is sufficiently low so as to prevent degradation or damage to the tube gel water blocking agent 103 or fiber coatings. The strength and flexibility of the solder is selected to allow the cable 100 to bend sufficiently for good cable handling without separating the coils of the spring 115 or separating the copper tube 108 and crimp sleeve 114 interface during bending.

The final step includes molding an insulation 117 over crimp sleeve 114, using well-known techniques, such that the insulation mold 117 annularly surrounds the crimp sleeve 114, the two exposed conductive tubes 108, 208, and the exposed outer layer of the first wire strand 107 and the spring 115, as shown in FIG. 2. The insulation mold 117 is further amalgamated with the ends of the insulation layers 109, 209. Polyethelene or other suitable insulating materials can be used for the insulation mold 117, and the wall thickness of the insulation mold 117 over the cable crimp joint 110 must be sufficiently thick to withstand the voltage requirements of the cable design.

The solder used in the previous soldering step with respect to the spring 115, should be a tin/lead solder or other soldering material with a melt temperature which is higher than the temperature of the insulation mold 117 application, but, as stated above, should be sufficiently low to avoid damaging the water blocking agent 103 or fiber coatings.

Accordingly, by varying the inside crimp diameter of the cable joint 110, the sharing of force transfer between both layers 105, 106 and 205, 206 of the respective strands 107 and 207 and the crimp, can be maximized. This permits the minimum possible overall outside diameter and length, in that the cable crimp joint 110 carries the total load only in the maximum cross-sectional area of the crimp, around the tube 112. In the areas of the cable crimp joint 110 surrounding the two layers 105, 106 and 205, 206 of the respective strands 107 and 207, the load is shared between the wire strands 107 and 207 and the cable crimp.

In addition to fiber optic cables, the cable jointing apparatus and method of the present invention can be used in jointing two layer wire ropes, optical ground wires, and power cables, or anything that is metallic in structure that requires jointing. Plastic cables could also be jointed by using a glued structure rather than one which requires soldering.

Although the invention has been described in detail with reference to particular embodiments thereof, this description is not meant to be construed in a limiting sense. Various modifications of the disclosed embodiments, as well as alternative embodiments of the invention, will become apparent to persons skilled in the art upon reading the foregoing. It is therefore contemplated that such modifications can be made without departing from the scope of the present invention as defined in the appended claims.

What is claimed is:

1. A cable joint for jointing fiber optic cables, comprising:
   a first fiber optic cable including a first insulating layer, a first conductive tube disposed within said first insulating layer, a first wire strand disposed within said first conductive tube, and a first central tube containing a plurality of first optical fibers disposed under said first wire strand;
   a second fiber optic cable including a second insulating layer, a second conductive tube disposed within said second insulating layer, a second wire strand disposed within said second conductive tube, and a second central tube containing a plurality of second optical fibers disposed under said second wire strand;
   wherein said first wire strand and said second wire strand each have an inner layer and an outer layer, said inner layer and said outer layer being of different diameters and forming a first stepped portion and a second stepped portion, respectively, said second stepped portion being of a greater diameter than said first stepped portion, said second central tube bridging said first cable and said second cable between said inner layer of said first cable and said inner layer of said second cable; and
   a crimp sleeve disposed over said first stepped portion and said second stepped portion of each said first cable and said second cable, said crimp sleeve being substantially centrally located over said second central tube disposed between said inner layer of said first cable and said inner layer of said second cable.

2. The cable joint according to claim 1, wherein said crimp sleeve has a central portion disposed over said second central tube located between said inner layer of said first cable and said inner layer of said second cable, and two ends, and said crimp sleeve is tapered outwardly from said central portion of said crimp sleeve to said two ends of said crimp sleeve, such that said two ends of said crimp sleeve have an increased diameter compared to said central portion.

3. The cable joint according to claim 2, said cable joint further comprising:
   a spring disposed over said first wire strand of said first cable, said spring having two ends and a central portion, said spring being soldered at a first end of said two ends to said first conductive tube disposed over said first wire strand of said first cable, at said central portion of said spring, and at said second end of said spring at one end of said two ends of said crimp sleeve.

4. The cable joint according to claim 3, said cable joint further comprising:

a tube joint including a capillary tube in which said plurality of first and second optical fibers are joined; and wherein said first central tube and said second central tube are crimped to said capillary tube at said tube joint, said tube joint being disposed under said spring at said first cable.

5. The cable joint according to claim 4, said cable joint further comprising:

an insulation mold disposed over said first conductive tube, said spring, said crimp sleeve, said second conductive tube, and amalgamated with said first insulating layer and said second insulating layer.

6. The cable joint according to claim 4, wherein said insulation mold is formed of polyethylene.

7. The cable joint according to claim 3, wherein said spring is comprised of one of copper, brass, and steel.

8. The cable joint according to claim 2, said cable joint further comprising:

a circumferential ring disposed at one end of said two ends of said crimp sleeve, said ring being formed integrally with and protruding from an inner surface of said crimp sleeve, said ring being disposed over said second conductive tube of said second cable and providing a hermetic seal when crimped to said second conductive tube.

9. The cable joint according to claim 8, wherein said crimp sleeve and said integral circumferential ring are comprised of one of steel, titanium, and beryllium/copper.

10. The cable joint according to claim 2, wherein when said crimp sleeve is crimped at said inner layer and said outer layer of each of said first cable and said second cable, said two ends of said crimp sleeve attain substantially a same diameter as said central portion such that said crimp sleeve has substantially the same diameter along its length.

11. The cable joint according to claim 1, further comprising an epoxy adhesive and carbide grit which is applied to said inner layer and said outer layer of each of said first cable and said second cable for added strength of the cable joint.

12. The cable joint according to claim 1, wherein said conductive tube is comprised of copper.

13. The cable joint according to claim 1, wherein said crimp sleeve has radiused ends at said two ends.

14. The cable joint according to claim 1, wherein a space between said first central tube and said first optical fibers, and said second central tube and said second optical fibers, contains a water blocking agent which allows said first and second optical fibers to be suspending in a low stress condition.

15. A cable joint for jointing fiber optic cables, comprising:

a first fiber optic cable including a first insulating layer, a first conductive tube disposed within said first insulating layer, a first wire strand disposed within said first conductive tube, and a first central tube containing a plurality of first optical fibers disposed under said first wire strand;

a second fiber optic cable including a second insulating layer, a second conductive tube disposed within said second insulating layer, a second wire strand disposed within said second conductive tube, and a second central tube containing a plurality of second optical fibers disposed under said second wire strand;

wherein said first wire strand and said second wire strand each have an inner layer and an outer layer, said inner layer and said outer layer being of different diameters and forming a first stepped portion and a second stepped portion, respectively, said second stepped portion being of a greater diameter than said first stepped portion, said second central tube bridging said first cable and said second cable between said inner layer of said first cable and said inner layer of said second cable; and a crimp sleeve disposed over said first stepped portion and said second stepped portion of each said first cable and said second cable, said crimp sleeve tapering outwardly from a central portion of said crimp sleeve which is centrally located over said second central tube disposed between said inner layer of said first cable and said inner layer of said second cable, to two ends of said crimp sleeve, such that said two ends of said crimp sleeve have an increased diameter compared to said central portion.

16. A cable joint for jointing fiber optic cables, comprising:

a first fiber optic cable including a first insulating layer, a first conductive tube disposed within said first insulating layer, a first wire strand disposed within said first conductive tube, and a first central tube containing a plurality of first optical fibers disposed under said first wire strand;

a second fiber optic cable including a second insulating layer, a second conductive tube disposed within said second insulating layer, a second wire strand disposed within said second conductive tube, and a second central tube containing a plurality of second optical fibers disposed under said second wire strand;

wherein said first wire strand and said second wire strand each have an inner layer and an outer layer, said inner layer and said outer layer being of different diameters and forming a first stepped portion and a second stepped portion, respectively, said second stepped portion being of a greater diameter than said first stepped portion, said second central tube bridging said first cable and said second cable between said inner layer of said first cable and said inner layer of said second cable; and a crimp sleeve having two ends, said crimp sleeve being disposed over said first stepped portion and said second stepped portion of each said first cable and said second cable, said second central tube being disposed between said inner layer of said first cable and said inner layer of said second cable; and a circumferential ring disposed at one end of said two ends of said crimp sleeve, said ring being formed integrally with and protruding from an inner surface of said crimp sleeve, said ring being disposed over said second conductive tube of said second cable and providing a hermetic seal when crimped to said second conductive tube.

17. The cable joint according to claim 16, wherein said crimp sleeve is tapered outwardly from a central portion of said crimp sleeve which is over said second central tube disposed between said inner layer of said first cable and said inner layer of said second cable, to said two ends of said crimp sleeve, such that said two ends of said crimp sleeve have an increased diameter compared to said central portion.

18. A cable joint for jointing fiber optic cables, comprising:
   a first fiber optic cable including a first insulating layer, a first conductive tube disposed within said first insulating layer, a first wire strand disposed within said first conductive tube, and a first central tube containing a plurality of first optical fibers disposed under said first wire strand;
   a second fiber optic cable including a second insulating layer, a second conductive tube disposed within said second insulating layer, a second wire strand disposed within said second conductive tube, and a second central tube containing a plurality of second optical fibers disposed under said second wire strand;
   wherein said first wire strand and said second wire strand each have an inner layer and an outer layer, said inner layer and said outer layer being of different diameters and forming a first stepped portion and a second stepped portion, respectively, said second stepped portion being of a greater diameter than said first stepped portion, said second central tube bridging said first cable and said second cable between said inner layer of said first cable and said inner layer of said second cable; and
   a crimp sleeve having two ends, said crimp sleeve being disposed over said first stepped portion and said second stepped portion of each said first cable and said second cable, said second central tube being disposed between said inner layer of said first cable and said inner layer of said second cable; and
   a spring disposed over said first wire strand of said first cable, said spring having two ends and a central portion, said spring being soldered at a first end of said two ends to said first conductive tube disposed over said first wire strand of said first cable, at said central portion of said spring, and at said second end of said spring at a first end of said two ends of said crimp sleeve.

19. The cable joint according to claim 18, wherein said crimp sleeve is tapered outwardly from a central portion of said crimp sleeve which is over said second central tube disposed between said inner layer of said first cable and said inner layer of said second cable, to said two ends of said crimp sleeve, such that said two ends of said crimp sleeve have an increased diameter compared to said central portion.

20. A method for making a cable joint for fiber optic cables, comprising the steps of:
   exposing a portion of a first insulation layer, a first conductive tube, a first wire strand including a first outer layer and a first inner layer, a first central tube, and first optical fibers of a first cable;
   exposing a portion of a second insulation layer, a second conductive tube, a second wire strand including a second outer layer and a second inner layer, a second central tube, and second optical fibers of a second cable;
   sliding a crimp sleeve having two ends over said first central tube and under said first wire strand;
   forming a tube joint by joining said first and second optical fibers such that said tube joint is formed under said first wire strand of said first cable;
   inserting said second wire strand into one end of said two ends of said crimp sleeve;
   inserting said first wire strand into a second end of said two ends of said crimp sleeve;
   crimping said crimp sleeve at a center portion of said crimp sleeve, said crimp being applied at each of said first inner layer and said first outer layer of said first cable, and at said second inner layer and said second outer layer of said second cable, to provide stepped portions of different diameters within said crimp sleeve.

21. The method of making a cable joint according to claim 20, wherein the step of forming the tube joint comprises the steps of:
   joining first optical fibers of said first cable and second optical fibers of said second cable;
   inserting a capillary tube over said first and second optical fibers, said capillary tube extending between said first inner layer of said first cable and said second inner layer of said second cable; and
   crimping said first central tube and said second central tube to said second cable.

22. The method of making a cable joint according to claim 20, wherein said crimping step further comprises the step of:
   crimping a circumferential ring which is integral with and protrudes from an inner surface of said crimp sleeve at said second end of said two ends of said crimp sleeve, onto said second conductive tube of said second cable to provide a hermetic seal.

23. The method of making a cable joint according to claim 20, further comprising the step of:
   applying a spring around said first wire strand between said first conductive tube and said one end of said two ends of said crimp sleeve; and
   soldering said spring to said first conductive tube and said first end of said crimp sleeve.

24. The method of making a cable joint according to claim 23, wherein said step of applying said spring further comprises the step of coiling a longitudinal length of wire onto said first wire strand.

25. The method of making a cable joint according to claim 24, wherein said solder is comprised of tin//lead and a temperature of said solder is controlled to approximately 250–300° C.

26. The method of making a cable joint according to claim 20, further comprising the step of molding an insulation over said crimp sleeve, said first conductive tube and said second conductive tube, said first wire strand and said spring, and amalgamating said insulation to said first insulation layer and said second insulation layer.

27. The method of making a cable joint according to claim 20, wherein said crimp sleeve is tapered outwardly from a central portion of said crimp sleeve to said two ends of said crimp sleeve, said two ends of said crimp sleeve having a larger diameter than said central portion.

28. The method of making a cable joint according to claim 27, wherein said crimping step is performed to attain substantially a same diameter as said central portion of said crimp sleeve and at said two ends of said crimp sleeve.

29. The method of making a cable joint according to claim 20, wherein prior to said inserting steps, the method further comprises the step of:
   applying an epoxy adhesive and carbide grit to each said first and second inner layer and each said first and second outer layer of said first cable and said second cable, respectively, for providing added strength to the cable joint.

30. The method of making a cable joint according to claim 29, wherein after applying said epoxy adhesive and carbide grit, a split die is used to restore said first wire strand to its full lay length prior to inserting said first wire strand into said crimp sleeve.

31. The method of making a cable joint according to claim 20, wherein a binder is used to temporarily hold said first wire strand in place during said crimping step.

32. A method for making a cable joint for fiber optic cables, comprising the steps of:

exposing a portion of a first insulation layer, a first conductive tube, a first wire strand including a first outer layer and a first inner layer, a first central tube, and first optical fibers of a first cable;

exposing a portion of a second insulation layer, a second conductive tube, a second wire strand including a second outer layer and a second inner layer, a second central tube, and second optical fibers of a second cable;

pulling back the first wire strand including said first outer layer and said first inner layer;

sliding a crimp sleeve having two ends over said first central tube and under said first wire strand;

forming a tube joint by joining first optical fibers of said first cable and second optical fibers of said second cable, inserting a capillary tube over said first and second optical fibers, and extending said capillary tube such that said capillary tube extends between said first inner layer of said first cable and said second inner layer of said second cable, and crimping said first central tube and said second central tube to said capillary tube, such that said tube joint is formed under said first wire strand of said first cable;

moving said crimp sleeve into position over said first wire strand and said second wire strand;

inserting the second wire strand into one end of said two ends of said crimp sleeve;

restoring said first inner layer and said first outer layer of said first wire strand over said first central tube;

inserting said first wire strand into a second end of said two ends of said crimp sleeve; and crimping said crimp sleeve at a center portion of said first inner layer and said first outer layer of said first cable, at said second inner layer and said second outer layer of said second cable, and at a circumferential ring which is integral with and protrudes from an inner surface of said crimp sleeve at said second end of said two ends of said crimp sleeve, onto said second conductive tube of said second cable, to provide a hermetic seal.

33. A method for making a cable joint for fiber optic cables, comprising the steps of:

exposing a portion of a first insulation layer, a first conductive tube, a first wire strand including a first outer layer and a first inner layer, a first central tube, and first optical fibers of a first cable;

exposing a portion of a second insulation layer, a second conductive tube, a second wire strand including a second outer layer and a second inner layer, a second central tube, and second optical fibers of a second cable;

pulling back the first wire strand including said first outer layer and said first inner layer;

sliding a crimp sleeve having two ends over said first central tube and under said first wire strand;

forming a tube joint by joining first optical fibers of said first cable and second optical fibers of said second cable, inserting a capillary tube over said first and second optical fibers, and extending said capillary tube such that said capillary tube extends between said first inner layer of said first cable and said second inner layer of said second cable, and crimping said first central tube and said second central tube to said capillary tube, such that said tube joint is formed under said first wire strand of said first cable;

applying an epoxy adhesive and carbide grit to said second inner layer and said second outer layer of said second cable;

moving said crimp sleeve into position over said first wire strand and said second wire strand;

inserting the second wire strand into one end of said two ends of said crimp sleeve;

restoring said first inner layer and said first outer layer of said first wire strand over said first central tube;

applying an epoxy adhesive and carbide grit to said first inner layer and said first outer layer of said first cable;

inserting said first wire strand into a second end of said two ends of said crimp sleeve;

crimping said crimp sleeve at a center portion of said first inner layer and said first outer layer of said first cable, at said second inner layer and said second outer layer of said second cable, and at a circumferential ring which is integral with and protrudes from an inner surface of said crimp sleeve, at said second end of said two ends of said crimp sleeve, onto said second conductive tube of said second cable, to provide a hermetic seal;

applying a spring around said first wire strand between said first conductive tube and said first end of said crimp sleeve;

soldering said spring to said first conductive tube and said first end of said crimp sleeve; and molding an insulation over said crimp sleeve, said first conductive tube and said second conductive tube, said first wire strand and said spring, and amalgamating said insulation to said first insulation layer and said second insulation layer.

* * * * *